United States Patent [19]

Haas, II

[11] Patent Number: 4,684,105
[45] Date of Patent: Aug. 4, 1987

[54] BALL VALVE

[76] Inventor: Carroll J. Haas, II, 6215 Bravo Ct. Apt. 2A, Kalamazoo, Mich. 49002

[21] Appl. No.: 800,480

[22] Filed: Nov. 21, 1985

[51] Int. Cl.$^4$ .......................... F16K 25/00; F16K 5/06
[52] U.S. Cl. .................................... 251/150; 251/151; 251/171; 251/315; 251/316
[58] Field of Search ............... 251/315, 316, 148, 150, 251/151, 152, 171

[56] References Cited

U.S. PATENT DOCUMENTS

| | | | |
|---|---|---|---|
| 3,550,902 | 12/1970 | Pidgeon et al. | 251/315 |
| 4,023,773 | 5/1977 | Wise | 251/315 |
| 4,052,091 | 10/1977 | Bowden | 251/148 |
| 4,059,250 | 11/1977 | Guldener et al. | 251/315 |
| 4,272,057 | 6/1981 | Haugland | 251/315 |

Primary Examiner—Martin P. Schwadron
Assistant Examiner—Sheri M. Novack
Attorney, Agent, or Firm—Flynn, Thiel, Boutell & Tanis

[57] ABSTRACT

A ball valve having means for releasably holding the sealing surfaces of a seal carrier in contact with the valve body and ball. The holding means includes a durable locking strip which is inserted through an opening in the valve body into an annular channel between the valve body and the seal carrier.

7 Claims, 5 Drawing Figures

U.S. Patent  Aug. 4, 1987  Sheet 1 of 2  4,684,105
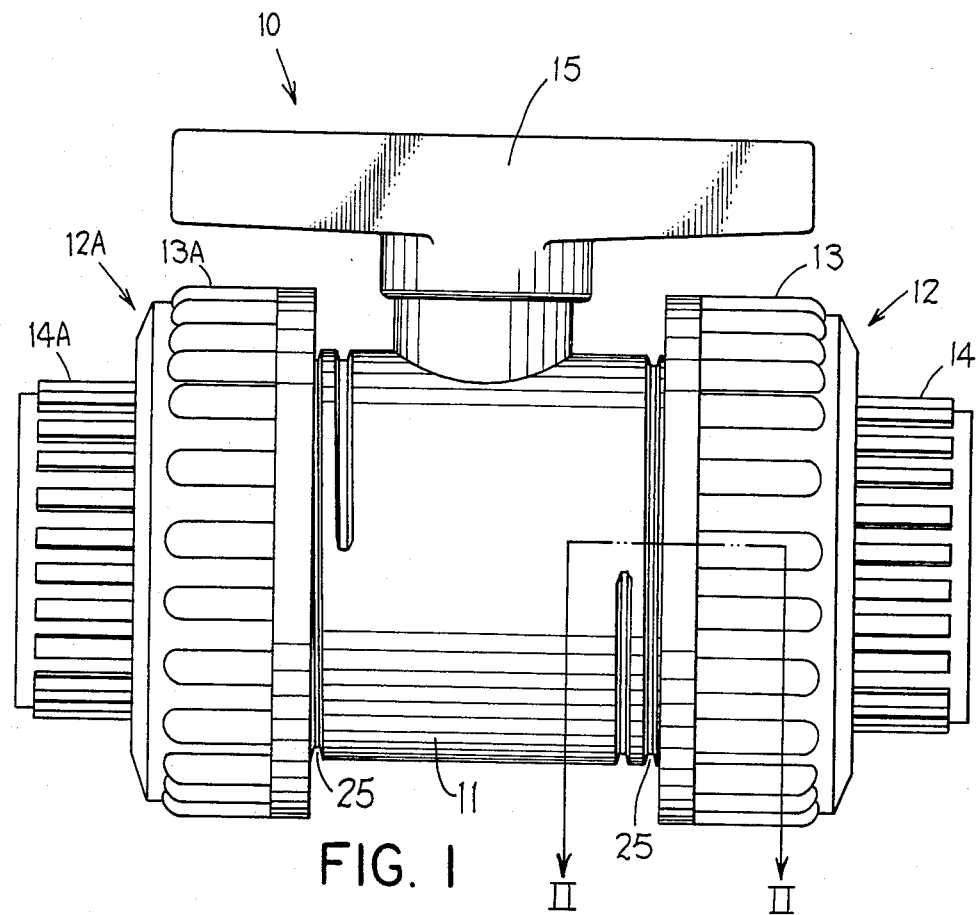
FIG. 1
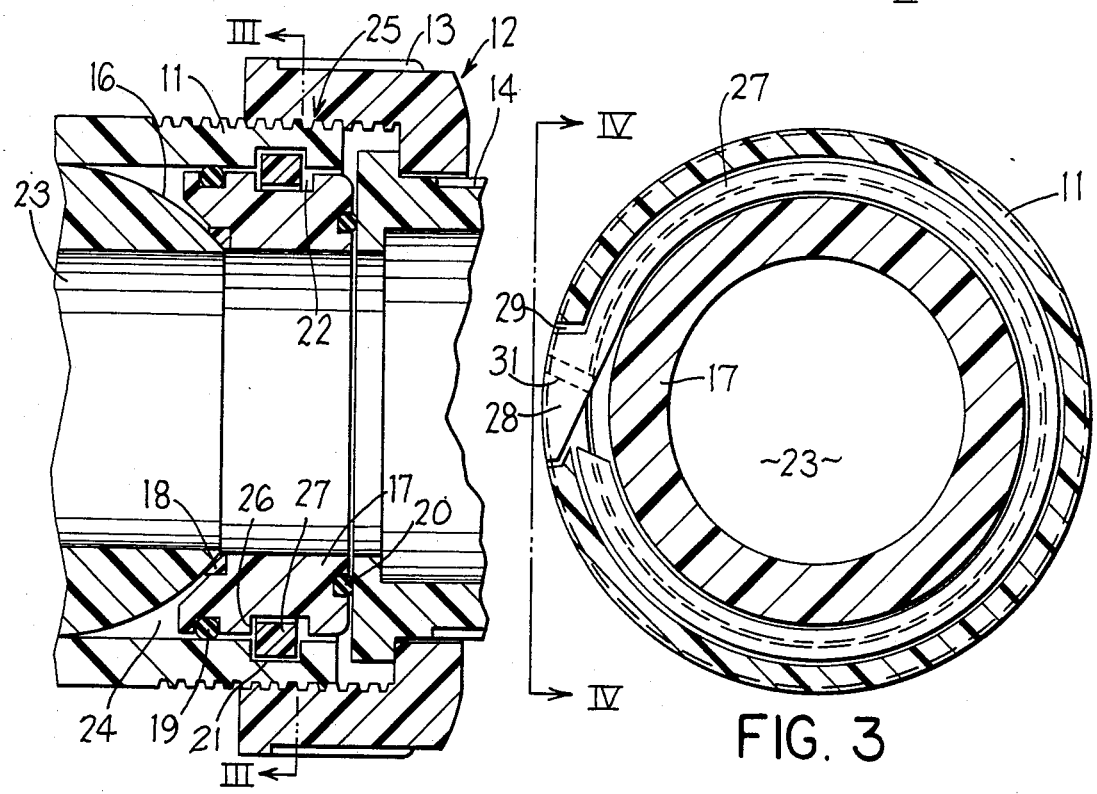
FIG. 2
FIG. 3

BALL VALVE

BACKGROUND OF THE INVENTION

This invention relates to improvements in ball valves. More specifically, the invention relates to a ball valve structure in which at least one seal of the valve is releasably held in place by mounting same on a removable seal insert which is held in place in the valve body by a special locking element.

Ball valves are very well known in the art as effective means for controlling the flow of fluid. Such valves generally comprise a rotatable spherical ball located in a chamber within the valve body. A fluid passageway through the ball permits the flow of fluid through the valve when the ball is in an open position. Ideally, when the ball is in the closed position leakage of fluid through the valve is prevented. This requires the use of washers, gaskets, O-rings and other sealing arrangements which contact the ball and the interior wall of the valve body to provide a tight, substantially leak-proof fit of the ball when the valve is closed.

These sealing systems are subject to wear because of contact with the movable ball, damage from exposure to extremes of temperature and pressure, or contact with harmful chemicals passing through the valve. Therefore, periodic maintenance of the sealing systems must be performed.

It is known in the art to provide ball valve seals on opposite sides of the ball and adapted for sealingly contacting the ball in the open and closed positions thereof. One or both of the seals is provided on a hollow cylindrical seal carrier which is removable from the valve body. It is necessary to be able to assemble the valve with the ball already located inside the valve body and to be able to adjust the sealing pressure of the seals on the ball. In some constructions, the seal carrier is glued in place in the valve body, but such a construction is not readily adjustable. In other constructions, the seal carrier or a lock ring therefor, is screwed into the valve body. The screwed-in constructions cannot be adjusted when the valve union is in place. Also, the screwed-in constructions are not as safe as is desired. If the nut of the union is removed from the valve body while the ball valve is closed and is still under pressure, the pressure of the fluid presses the ball axially against the threads. This pressure can destroy the screw connection and cause the seal carrier and the ball to be blown out of the valve body, with possibly serious consequences. In another construction, the removable seal carrier is held in place against the ball and the interior wall of the valve body by means of a bayonet-type mount. A bayonet-type mounting system typically involves one or more pins or other projections extending radially from the seal carrier which are received in one or more grooves on the interior wall of the valve body when the carrier is rotated. Such a bayonet-type mount has various drawbacks which reduce its utility, namely: bayonet-type mounts can, at the most, provide a surface engagement area of only about 50% of the circumference of the valve body and bayonet-type mounts can cause mistakes in use because sometimes it is difficult to ascertain whether the pin-carrying seal carrier has been completely turned so as to be fully engaged and releasably locked in place.

SUMMARY OF THE INVENTION

An improved structure has been devised for holding a seal in place against the ball of a ball valve. The structure according to the invention is safer because the connection between the seal carrier and the valve body is stronger. It is possible to remove the union nut while the valve is under pressure with reduced risk that the ball will be blown out of the valve body. The holding structure includes a flexible, durable locking strip which is inserted into an annular channel formed by and between the valve body and the cylindrical seal carrier, which channel extends circumferentially around the entire circumference of the seal carrier and the internal wall of the valve body. The locking strip solidly engages both the valve body and the seal carrier thereby holding the seal in position for sealing contact with the ball. Means are provided so that the locking strip can be easily inserted or withdrawn from the annular channel via an opening or insertion slot leading to the annular channel.

Several advantages are achieved by the invention. The locking strip insures that almost 100% of the circumference of the internal wall of the valve body is releasably fixedly interconnected with the seal carrier, thereby providing a more secure seal than can be obtained using a screwed-in or bayonet-type mount. Unlike the bayonet-type mounts, in which sometimes it is difficult to ascertain whether the seal carrier is fully locked in place, the locking strip of the present invention will protrude from the opening or insertion slot if it is not in a fully installed position so that this condition will be readily observable. Furthermore, the locking strip permits small adjustments of the position of seal carrier to be made from outside the valve so as to increase or decrease, as needed, the pressure of the seal against the ball. To provide for this external adjustability, the seal carrier is mounted so that it can slide axially in the valve body to a limited extent. The union nut and the internal coupling part of the union are used to hold the seal carrier in place and to adjust the sealing pressure.

BRIEF DESCRIPTION OF DRAWINGS

FIG. 1 is a side view of the ball valve of the present invention.

FIG. 2 is a partial cross-sectional view through the valve taken along line II—II of FIG. 1.

FIG. 3 is a cross-sectional view through the valve body taken along line III—III of FIG. 2.

DETAILED DESCRIPTION

Figure 4:
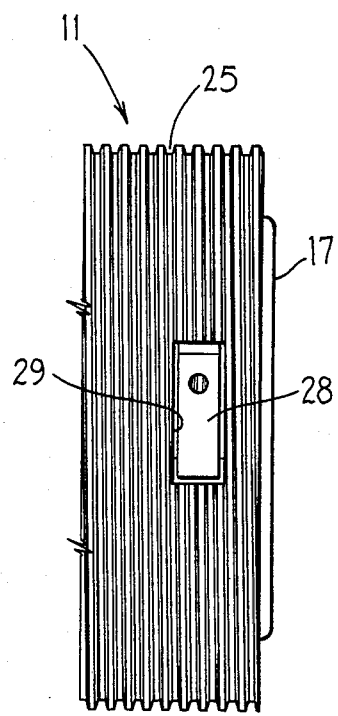
FIG. 4 is a side view of the threaded portion of the valve showing the location of an installed locking strip and insertion slot.

The ball valve 10 comprises a generally cylindrical, hollow valve body 11 having threaded end portions 25 for threadably engaging screwed pipe unions 12 and 12A. The unions 12 and 12A are comprised of internally threaded, shouldered nuts 13 and 13A, the shoulders of which are engageable with the radially outwardly projecting flanges of the cylindrical, flanged coupling parts 14 and 14A.

The handle 15 is connected by any suitable conventional means with the ball 16, to rotate the ball through an angle of 90° in order to open or close the valve. The ball 16 is located within the ball valve cavity 24 of the valve body and has a passageway 23 which permits fluid to flow therethrough. The ball 16 may be capable of a small amount of axial movement with respect to the valve body when the valve is in a closed position.

A hollow, generally cylindrical, seal carrier 17 is disposed inside one end of the valve body 11 adjacent to the ball 16. The seal carrier 17 carries an annular seal ring 18 made of a durable, relatively low friction, sealing material, such as Teflon, nylon or Delrin, which seal ring sealingly and slidingly engages the outer surface of the ball 16 to prevent flow of fluid into the cavity 24 when the parts are in the open position as shown in FIG. 2 and when the ball is rotated through an angle of 90° to the closed position. Additionally, an O-ring 19 made of rubber or other suitable material is provided between the seal carrier 17 and the internal wall of the valve body 11 to minimize fluid leakage therebetween. A second O-ring 20 is provided between the flange of the coupling part 14 and the opposing axially outer end of the seal carrier 17.

An annular groove 21 is formed in and extends circumferentially around the internal wall of the valve body 11. The seal carrier 17 has a recess 22 which is radially opposed to the groove 21 and has a radially outwardly projecting shoulder 26 at its axially inner end. A locking strip 27 is received in the groove 21 and the recess 22 to releasably lock the seal carrier 17 in place inside the valve body 11. The locking strip 27 is a radially split, annular ring of generally rectangular cross-section and it has a radially outwardly projecting locking pawl 28 at one free end of said strip. The seal carrier 17 is capable of being moved axially inwardly relative to locking strip 27 to adjust the sealing pressure between the seal 18 and ball 16 as described below. However, if the nut 13 is loosened while the ball valve is closed and the valve is still under pressure, the seal carrier 17 can shift axially outwardly only until its shoulder 26 engages the opposing portion of the locking strip 27. Thus, the seal carrier 17 is safely retained in place within the valve body.

As shown in FIG. 3, access to the annular groove 21 within the valve body 11 is provided via an insertion slot 29 which opens radially through the valve body 11 between the opposite axial ends of the threaded end portion 25 (FIG. 4). The locking strip 27 is made of a flexible, durable material, such as Delrin resin. The parts are assembled by inserting the seal carrier 17 into the valve body 11 until the groove 21 and recess 22 are aligned. Then the locking strip 27 is introduced into the insertion slot 29 and is fed into and pushed through the annular groove 21 until the parts are in the position shown in FIG. 3 wherein the locking pawl 28 is received in the slot 29.

A hole 31 is provided through the body of the pawl 28 of the locking strip 27 to facilitate mechanically engaging the locking strip 27 with a hook or other device to aid in removing the locking strip from the valve.

As shown in FIG. 4, the insertion slot 29 is located between and spaced from the axial ends of the threaded portion 25 of the valve body 11. When the nut 13 of union 12 is screwed down over the threaded portion 25 it will cover the insertion channel 29 and the locking strip 27 thereby keeping the locking strip 27 securely in place.

As shown in FIGS. 2 and 4, the axially outer end of the seal carrier 17 projects a small distance outwardly beyond the axial end of the valve body 11. The flange of the coupling part 14 engages the axially outer end of the seal carrier 17 and the O-ring 20. Thus, by rotating the nut 13 of the union 12 on the threaded portion of the valve body, the seal carrier 17 can be moved a small distance axially with respect to valve body 11 whereby to adjust the contact pressure between the ring 18 and the ball 16.

The opposite end (leftward end in FIG. 1) of the valve body also contains a seal carrier including a seal ring, like seal ring 18, for engaging the opposite side of the ball 16. This seal carrier can, if desired be of the same structure as seal carrier 17 and its associated parts. It is not usually necessary, however, to provide two removable seal carriers at opposite ends of the valve body 11. Rather, the seal carrier provided in the leftward end of the valve body can be integral with and not removable from the valve body, if desired.

Figure 5:
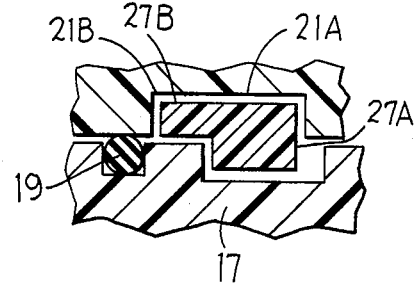
FIG. 5 is a fragmentary view of a modification.

FIG. 5 illustrates a modification in which the groove 21A has an axially inwardly extending portion 21B which extends substantially up to the O-ring. The locking strip 27A has an integral extension 27B which extends into and substantially fills the portion 21B. This modified design is useful to minimize the possibility that axially outward movement of the seal carrier 17 can roll the locking strip 27 out of the groove 21.

Thus, the invention provides a ball valve which is externally adjustable and is safer than the prior art constructions because the ball is prevented from being blown out of the valve body when the nut of the union is loosened.

The embodiments of the invention in which an exclusive property or privilege is claimed are defined as follows:

1. In a ball valve comprising a valve body having an axially extending bore, a rotatable valve ball in said bore, annular sealing ring surfaces disposed in said bore for sealingly engaging opposite axial sides of said ball, at least one of said annular sealing ring surfaces being provided on the axially inner end of an annular seal carrier which is removably disposed within said bore adjacent to one axial end of said valve body, the improvement which comprises: said seal carrier has a circumferentially extending recess in the peripheral surface thereof, said circumferentially extending recess being located between and spaced from the opposite axial ends of said seal carrier; said valve body having a circumferentially extending groove in the radially inner surface thereof, said circumferentially extending groove being spaced from said one axial end of said valve body and being disposed in alignment with said circumferentially extending recess so that said groove and recess mate and define a continuous circumferentially extending passageway, said valve body having an insertion slot extending radially outwardly from said circumferentially extending groove through the exterior surface of said valve body; and a radially split, solid, flexible, annular, locking ring circumferentially slidably received in said passageway for releasably retaining said seal carrier within said valve body.

2. A ball valve as claimed in claim 1 in which said annular locking ring is a one-piece member of generally rectangular cross-section.

3. A ball valve as claimed in claim 1 which the width of said recess is larger than the widths of said groove and said locking ring so that said seal carrier can be moved axially with respect to said valve body and lock ring.

4. A ball valve as claimed in claim 3 including a union at said one axial end of said valve body, said union comprising a screw thread on the exterior of said valve body, said seal carrier having an axially outer end face and an annular groove in said end face, an O-ring received in said annular groove and projecting axially outwardly from said end face, a flanged tubular coupling part having an end face at the axially inner end thereof and opposed to said axially outer end face of said seal carrier, and a nut threaded onto said screw thread of said valve body and having a radially inwardly extending flange engaging the flange of said coupling part for holding same against said outer axial end of said seal carrier in sealing engagement with said O-ring.

5. A ball valve as claimed in claim 4 in which said insertion slot opens through said screw thread and said nut covers said insertion slot.

6. A ball valve as claimed in claim 5 which is made entirely of synthetic resin parts.

7. A double union ball valve, comprising:
a tubular valve body having opposite axial ends and a continuous cylindrical bore extending between said axial ends, said valve body having externally threaded portions adjacent to said axial ends thereof;
a pair of flanged tubular coupling parts each located adjacent to and axially outwardly of one of said axial ends of valve body, said coupling parts each having an end face at the axially inner end thereof;
a pair of nuts for connecting said coupling parts to said valve body, each nut having an interally threaded portion threadedly engaged with the adjacent externally threaded portion of said valve body and having a radially inwardly extending flange engaging the flange of its associated coupling part for holding same in opposed relation to the adjacent axial end of said tubular valve body;
a rotatable valve ball disposed in said bore and spaced from the axial ends thereof;
two annular sealing ring surfaces disposed within said bore one on either axial side of said valve ball, said annular sealing ring surfaces being arranged to sealingly contact annular zones on the external surface of said valve ball on opposite axial sides thereof, at least one of said sealing ring surfaces being provided on an annular seal carrier which is removably disposed within said bore, said seal carrier having an axially outer end face opposed to the axially inner end face of the adjacent one of said coupling parts, said seal carrier having a coaxial annular recess in said axially outer end face;
an O-ring disposed in said annular recess and projecting axially outwardly therefrom into sealing engagement with the axially inner end face of the adjacent one of said coupling parts;
said seal carrier having a circumferentially extending recess in the peripheral surface thereof and located between and spaced from the opposite axial ends thereof;
said tubular valve body having a circumferentially extending groove in the radially inner surface thereof and located between and spaced from the opposite axial ends of the externally threaded portion at one axial end of said valve body, said circumferentially extending recess and groove being disposed in alignment with each other, said circumferentially extending recess in said seal carrier having a larger axial dimension than said groove;
said tubular valve body having an insertion slot extending radially outwardly from said circumferentially extending groove through said externally threaded portion at said one axial end of said valve body;
a radially split, solid, flexible, annular locking ring of generally rectangular cross-section circumferentially slidably received in said circumferentially extending recess and groove for releasably retaining said seal carrier within said valve body while permitting limited axial movement of said seal carrier within said valve body, said locking ring having a radially outwardly projecting locking pawl projecting into and substantially filling said insertion slot, the nut at said one axial end of said valve body covering said insertion slot and said locking pawl.

* * * * *